US012711004B1

(12) United States Patent
Meganathan et al.

(10) Patent No.: US 12,711,004 B1
(45) Date of Patent: Aug. 18, 2026

(54) PREDICTIVE APP FAILURE MITIGATION AND REMEDIATION

(71) Applicant: U.S. Bank National Association, Minneapolis, MN (US)

(72) Inventors: Sathiskumar Meganathan, Frisco, TX (US); Muthu Selvam, Huntersville, NC (US)

(73) Assignee: U.S. Bank National Association

( * ) Notice: Subject to any disclaimer, the term of this patent is extended or adjusted under 35 U.S.C. 154(b) by 0 days.

(21) Appl. No.: 19/392,602

(22) Filed: Nov. 18, 2025

(51) Int. Cl.
*G06F 11/00* (2006.01)
*G06F 3/04842* (2022.01)

(52) U.S. Cl.
CPC ........ *G06F 11/008* (2013.01); *G06F 3/04842* (2013.01)

(58) Field of Classification Search
CPC ............... G06F 11/008; G06F 3/04842; G06F 11/3476; G06F 11/0706; G06F 11/079; G06F 11/0793; G06F 11/3447; H04L 43/04; G06Q 30/04
See application file for complete search history.

(56) References Cited

U.S. PATENT DOCUMENTS

2003/0135474 A1* 7/2003 Circenis ............. G06Q 30/0283 705/400
2015/0039747 A1* 2/2015 Meloche ................. H04L 43/04 709/224
2015/0242891 A1* 8/2015 Mimran ............. G06Q 30/0255 705/14.53
2017/0185475 A1* 6/2017 Dey .................... G06F 11/3055

* cited by examiner

*Primary Examiner* — Ashish Thomas
*Assistant Examiner* — Kayo Lisa Rusin
(74) *Attorney, Agent, or Firm* — Garg Law Firm, PLLC; Rakesh Garg; Chris Ziolkowski

(57) ABSTRACT

From a first usage data relating to a behavior of an app during an execution on a first device, a feature related to the behavior is extracted. Based on the feature, the first usage data is clustered into a cluster with a second usage data from a second device. Resolution data related to the feature is obtained; the resolution data includes at least a state of development of code related to the behavior. By the first usage data and the resolution data as inputs to a trained prediction model, a likelihood of a crash of the app on the first device is predicted as a score. The score and the state of development of the code are output to the first device.

20 Claims, 10 Drawing Sheets

200

USER DEVICE 202
CRASH ANALYSIS LIBRARY 204
CLIENT CONNECTION 206
LOCAL STORE 208
USAGE DATA 210
CRASH PREDICTION, RESOLUTION DATA 212
CRASH MONITORING SERVER 214
API 216
CLUSTERING 218
DEV INPUT 220
PREDICTION MODEL 222
DATABASE 224
USAGE DATA CLUSTERS 226
RESOLUTION DATA 228
DEVELOPMENT ENVIRONMENT 230
RESOLUTION WORKFLOW 232
CRASH LIVE VIEW 234
UI 236

700

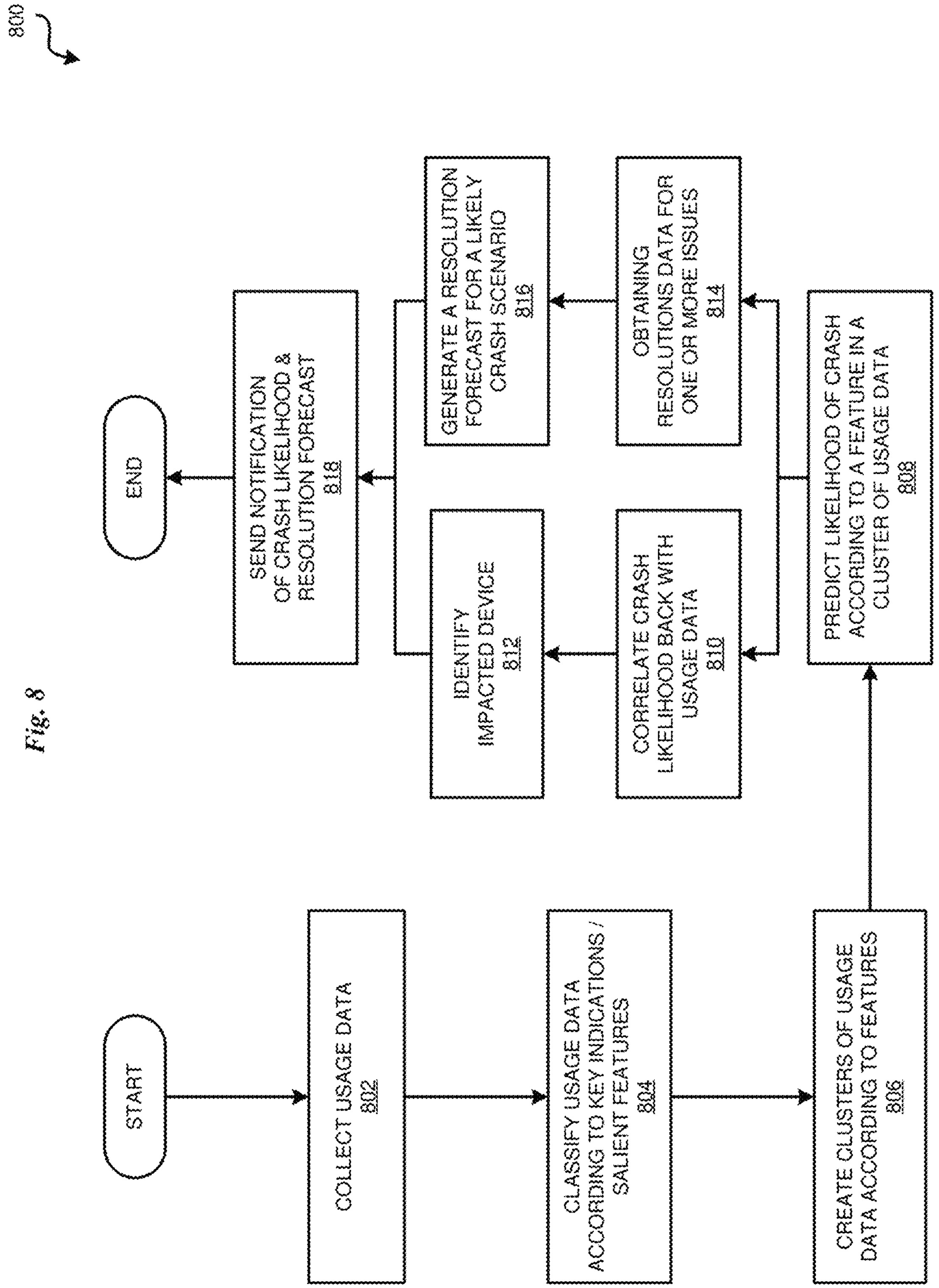

*Fig. 8*

START

COLLECT USAGE DATA
802

CLASSIFY USAGE DATA ACCORDING TO KEY INDICATIONS / SALIENT FEATURES
804

CREATE CLUSTERS OF USAGE DATA ACCORDING TO FEATURES
806

PREDICT LIKELIHOOD OF CRASH ACCORDING TO A FEATURE IN A CLUSTER OF USAGE DATA
808

CORRELATE CRASH LIKELIHOOD BACK WITH USAGE DATA
810

IDENTIFY IMPACTED DEVICE
812

OBTAINING RESOLUTIONS DATA FOR ONE OR MORE ISSUES
814

GENERATE A RESOLUTION FORECAST FOR A LIKELY CRASH SCENARIO
816

SEND NOTIFICATION OF CRASH LIKELIHOOD & RESOLUTION FORECAST
818

END

10

PREDICTIVE APP FAILURE MITIGATION AND REMEDIATION

BACKGROUND

The disclosure relates to the technical field of improving the reliability of software applications. More specifically, the disclosure relates to predictive mitigation and remediation of app failures.

An "app" is the short form of "application," which is a piece of software designed to run on a device like a smartphone, tablet, or computer. Normally, an app bundles code, graphics, and data into a single package that the operating system (OS) can install and launch. Typically, a user taps an icon corresponding to the app, the OS starts a process for the app, the process executes or runs the app code, optionally draws or renders a user interface on the screen, and enables the process to interact with the device's hardware and other services, such as the network, the camera, or the storage as may be needed to perform the app's functions. Stated simply, an app is the program that provides the functions and experiences a user sees and uses on their device.

Sometimes things go wrong with apps. For example, the app may try to do something the runtime environment on the device cannot handle, e.g., the app trying to access memory the app shouldn't, or a piece of code in the app throwing an unexpected error, the app can end up in a variety of undesirable states. For example, the OS may terminate the process, a crash screen may briefly flash, and the app's user interface (UI) may disappear. A modern OS also records a crash report that can be sent back to the developer, helping them pinpoint what went wrong. Even when the app doesn't crash outright, it can still operate in undesirable manners. For example, the app might exhibit behaviors such as slow-loading screens, invisible buttons, or missing data.

For users, these glitches are more than just annoyances; they erode trust. A sudden crash can leave users frustrated enough to uninstall, while a slow or unresponsive interface can make them abandon the app mid-task. Clear error messages, graceful fallbacks (like cached data), and quick retries can soften the impact. Developers use data from crash reports, performance reports, and user reports of app issues to act swiftly, keeping the user experience as smooth and favorable.

SUMMARY

The present disclosure includes inventive concepts relating generally to improving the performance of software applications, such as methods, systems, and computer programs for predictive app failure mitigation and remediation. A system of one or more computers can be configured to perform particular operations or actions by virtue of having software, firmware, hardware, or a combination of them installed on the system that in operation causes or cause the system to perform the actions. One or more computer programs can be configured to perform particular operations or actions by virtue of including instructions that, when executed by data processing apparatus, cause the apparatus to perform the actions.

In one general aspect, a computer-implemented method embodiment includes extracting, from a first usage data relating to a behavior of an app during an execution on a first device, a feature related to the behavior. The embodiment further includes clustering, based on the feature, the first usage data into a cluster with a second usage data from a second device. The embodiment further includes obtaining resolution data related to the feature, wherein the resolution data comprises at least a state of development of code related to the behavior. The embodiment further includes predicting, as a score, and by using the first usage data and the resolution data as inputs to a trained prediction model, a likelihood of a crash of the app on the first device. The embodiment further includes outputting to the first device, the score and the state of development of the code.

An embodiment includes a computer usable program product. The computer usable program product includes a computer-readable storage medium, and program instructions stored on the storage medium.

An embodiment includes a computer system. The computer system includes a processor, a computer-readable memory, and a computer-readable storage medium, and program instructions stored on the storage medium for execution by the processor via the memory.

BRIEF DESCRIPTION OF THE DRAWINGS

At least some novel features believed characteristic of examples of inventive concepts disclosed herein are set forth in the appended claims. The inventive concepts of the instant application, however, as well as a preferred mode of use, further objectives, and advantages thereof, will best be understood by reference to the following detailed description of the illustrative embodiments when read in conjunction with the accompanying drawings, wherein:

FIG. 8 depicts a process for predictive app failure mitigation and remediation in accordance with an illustrative embodiment.

DETAILED DESCRIPTION

Figure 1:
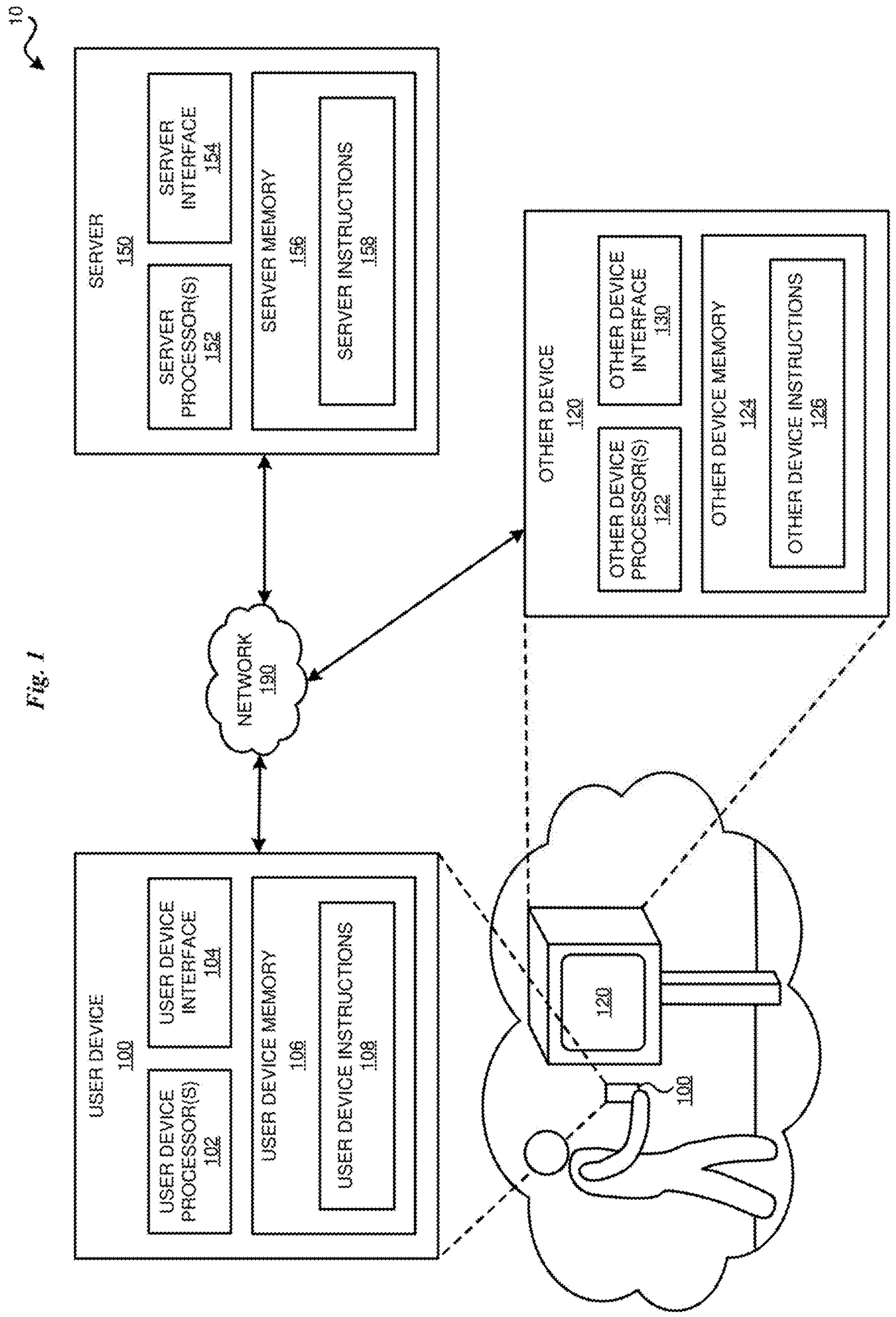
FIG. 1 depicts a block diagram of a computing environment in which an illustrative embodiment may be implemented.

The terms "app" and "application are used interchangeably unless expressly distinguished where used. Within the scope of the illustrative embodiments, a crash refers to an unexpected behavior of an application, including but not limited to the termination of the application. The term "real-time" means as near in time to a corresponding occurrence or event as technologically possible.

Prior approaches to mobile crash monitoring rely on tools that capture crash events, record stack traces, and log device and performance metrics. The illustrative embodiments recognize that these presently used tools, used primarily by development teams, enable the planning of future releases or hot-fixes, but do not provide a user-facing workflow for communicating whether a crash has been identified or is being addressed. The presently available data collected from devices allows crashes to be uniquely identified and reported with OS level data and metrics, which help developers troubleshoot the cause of the crash. Some examples of OS level data reported in presently available tools include memory usage, heap size, active process threads, cache contents, and other resource usage. Some metrics reported in the presently available tools include crash count, network and process latency counts, and app version.

The illustrative embodiments recognize that the presently available tools for crash management are developer-centric and fail to inform user about the crash that happened, why it happened, what is being done about it, what the user can possibly do or change to avoid similar crash or behavior, when a solution can be expected, and other user-centric aspects of crash management and crash impact mitigation. The illustrative embodiments recognize that a key gap exists in the present state of the art: users who experience or are likely to experience a crash must resort to customer support or leave negative reviews, and there is no mechanism to proactively inform users that the issue has been detected, is being addressed, or has a scheduled resolution. This deficiency results in unnecessary support interactions, diminished user trust, and potential damage to the product's reputation.

The illustrative embodiments recognize that a solution is needed that can detect imminent crashes in real time. A need exists to notify affected users with contextual information about the crash, provide live status updates on remediation efforts, provide any workarounds or other mitigation methods to avoid or minimize the crash impact until a remedy is ready. The illustrative embodiments recognize that such a solution would reduce customer support interactions concerning an app, improve user experience with the app, and enhance user confidence in the reliability of the app.

The illustrative embodiments address these deficiencies by providing a method, product, and system for predictive app failure mitigation and remediation. The various embodiments are described with respect to apps that allow user interaction only as non-limiting examples. An embodiment can be implemented to provide its output to an app or process executing in a device without any overt UI or user interaction, such that the app or process can take an automated action based on the embodiment's output.

The following is a description of a specific example implementation of the proposed architecture according to one embodiment. The description of the implementation illustrates the principle of operation of the embodiment using certain example use cases, example data, and corresponding results from the proposed architecture. All trademarks related to any specifically named examples, uses, characters, entities, values, numbers, limits, tools, techniques, models, steps, and operations described or referenced herein belong to their respective owners. The specific examples, uses, characters, entities, values, numbers, limits, tools, techniques, models, steps, and operations are not intended to be limiting. From this disclosure, those of ordinary skill in the art will be able to conceive many other variations of these described artifacts, and the same are contemplated within the scope of the illustrative embodiments. The description of the implementation is as follows—

The illustrative embodiments disclose a system and method for real-time crash mitigation and user notification in mobile applications. The system integrates a mobile software development kit (SDK), a telemetry aggregation backend, a predictive analytics engine, and a user-facing notification module. Together, these components enable the proactive identification of potential crash paths, the communication of impending failures to the end-user, and the dissemination of live status updates on remediation efforts.

A. Systems and Components

1. Mobile SDK

The system, as set forth herein, provides a mobile SDK that can be integrated into the application code of an app, such as a mobile banking or financial services app. In one embodiment, the SDK comprises a navigation monitor, a crash recorder, and a telemetry transmitter. The navigation monitor tracks user actions and screen transitions, recording a sequence of events that constitutes a navigation path. The crash recorder captures stack traces and device context whenever the application terminates unexpectedly. The telemetry transmitter packages the navigation path, crash information, and device metrics into a structured payload and sends it to the backend over a secure network connection (e.g., HTTPS).

2. Telemetry Aggregation Backend

The backend system includes a message ingestion service, a data store, and a crash identification module. The ingestion service receives telemetry payloads from numerous client devices and forwards them to a scalable data store (e.g., a NoSQL database). The crash identification module processes the stored logs, normalizes crash stack traces, and groups identical crashes based on hashing or signature matching. Each unique crash is assigned a crash identifier and enriched with metrics such as crash count, impacted user count, affected app versions, and device demographics.

3. Predictive Analytics Engine

The predictive engine receives real-time navigation paths from the SDK and compares them against a database of known crash signatures. In one embodiment, the engine implements a supervised classification model (e.g., a gradient-boosted decision tree) trained on historical telemetry. The model outputs a probability that the current navigation path will lead to a crash. If the probability exceeds a configurable threshold, the engine flags the user for notification.

4. User Notification Module

The notification module is responsible for delivering real-time alerts to the client device. In one embodiment, it utilizes the platform's push-notification service (e.g., FIREBASE Cloud Messaging or APPLE Push Notification Service) to display a banner or modal dialog that informs the user of an imminent crash, explains the underlying cause, and provides a suggested alternative action. The module also polls the backend for updates on the fix status and refreshes the notification content accordingly.

5. Engineering Workflow Integration

The backend exposes webhooks or API endpoints that allow integration with engineering tools such as issue trackers (e.g., JIRA, AZURE DevOps). When a new crash is identified, the system creates or updates a ticket and attaches the crash identifier, impact metrics, and current resolution status. Engineers can modify the target resolution date, attach patches, or add alternate user-facing actions. These updates are propagated back to the backend and subsequently displayed to affected users through the notification module.

B. Functional Operation

1. SDK Initialization

The mobile application loads the SDK at startup, initializing the navigation monitor, crash recorder, and telemetry transmitter. The SDK registers a crash handler that captures any unhandled exceptions.

2. Navigation Tracking

As the user navigates through the application, the navigation monitor records a sequential list of events (screen loads, button taps, API calls). Each event is time-stamped and optionally tagged with contextual data (e.g., user ID, device model).

3. Crash Recording

If the application terminates unexpectedly, the crash recorder captures the stack trace, the last navigation event sequence, and the device context. The recorder packages these elements into a crash report payload.

4. Telemetry Transmission

At the end of each user session or when a crash occurs, the telemetry transmitter sends the navigation path and crash report to the backend via a secure HTTP request.

5. Backend Ingestion and Crash Identification

The ingestion service receives the telemetry payload, stores it, and forwards it to the crash identification module. The module normalizes the crash stack trace, compares it to existing crash signatures, and assigns a crash identifier. It also updates aggregate metrics for the crash (e.g., total occurrences, affected users).

6. Predictive Assessment

The predictive analytics engine continuously receives navigation paths from the SDK. For each path, it computes a probability of leading to a known crash. When the probability exceeds the predefined threshold, the engine flags the user for notification.

7. User Notification

Upon flagging, the notification module dispatches a push notification to the client device. The notification includes a brief description of the potential crash, the reason (e.g., "navigation to transaction confirmation screen triggers memory overflow"), and an actionable alternative (e.g., "Retry after closing the app"). The notification also displays a status indicator (e.g., "Fix in progress-ETA 2 days").

8. Engineering Workflow Update

The backend communicates the crash identifier and impact metrics to the engineering workflow integration. Engineers can log a ticket, assign a target resolution date, and upload fixes. When the status changes (e.g., "Resolved," "Rollback"), the backend updates the crash record.

9. Real-Time Status Refresh

The notification module periodically polls the backend for updates on the crash resolution status. When an update is received, the module refreshes the notification content to reflect the new status (e.g., "Fix deployed-reattempt now").

10. Post-Resolution Monitoring

After a fix is released, the SDK continues to monitor navigation paths. If a crash recurrence is detected, the system re-reinitiates the notification workflow to inform users of a new issue.

C. Illustrative Example

Scenario—A mobile banking application includes a "Transfer Funds" feature.

Input: A user initiates a transfer, navigating through the "Transfer Confirmation" screen.

Intermediate State: The SDK records a navigation path: 'Home→Transfer→Confirmation.'

Crash Detection: The backend identifies a known crash triggered by the "Confirmation" screen due to an out-of-memory error.

Predictive Fla*: The predictive engine calculates a 0.82 probability that the current navigation path will lead to the identified crash.

Output: The notification module pushes an alert to the user: "An issue has been detected while completing transfers. A fix is in progress and expected within 24 hours. Please close the app and retry later."

Resolution Update: After 20 hours, the backend marks the crash as resolved; the notification updates to "Transfer now completed successfully. Thank you for your patience."

D. Alternate Embodiments

The SDK may be implemented as a library for a specific platform (e.g., ANDROID, IOS) or as a cross-platform framework (e.g., React Native).

The predictive engine may use unsupervised anomaly detection instead of supervised classification, thereby identifying novel crash patterns.

The notification module may deliver messages through alternative channels (e.g., in-app messaging, SMS) if push notifications are unavailable.

The backend may employ a microservices architecture, with separate services for ingestion, analytics, and notification orchestration.

The engineering workflow integration may connect to additional tools such as Slack, Confluence, or custom dashboards, enabling broader stakeholder awareness.

End of example implementation description.

FIG. 1 depicts a block diagram of a computing environment in which an illustrative embodiment may be implemented. The computing environment, labeled and referred to as system 10, includes user device 100, other device 120, and server 170 connected to a network. System 10 is configured to load and execute at least some of the computer code involved in performing the inventive methods, such as server instructions 158, which include the server-side computer program instructions of an embodiment, user device instructions 108, which include the user device-side computer program instructions of an embodiment, and other device instructions 126, which include the other device-side computer program instructions of an embodiment, as may be needed to perform the dynamic adaptation of identity related user interface.

User device 100 is a device used by a user that can be used as part of the processes described herein. User device 100 can include one or more aspects described elsewhere herein, such as in reference to computing environment 900 of FIG. 9. In many examples, user device 100 is a personal computing device, such as a smartphone, tablet, laptop computer, or desktop computer. But device 100 need not be so limited and may instead encompass other devices used by a user as part of processes described herein. In the illustrated example, user device 100 can include one or more user device processors 102, one or more user device interfaces 104, and user device memory 106, among other components.

The one or more user device processors 102 are one or more components of user device 100 that execute instructions, such as instructions that obtain data, process the data, and provide output based on the processing. The one or more user device processors 102 can include one or more aspects described below in relation to the one or more processors 912 of FIG. 9.

The one or more user device interfaces 104 are one or more components of user device 100 that facilitate receiving input from and providing output to something external to user device 100. The one or more user device interfaces 104 can include one or more aspects described below in relation to the one or more interfaces 918 of FIG. 9.

User device memory 106 is a collection of one or more components of user device 100 configured to store instructions and data for later retrieval and use. User device memory 106 can include one or more aspects described below in relation to memory 914 of FIG. 9. As illustrated, user device memory 106 stores user device instructions 108 and other suitable user device code.

User device instructions 108 are a set of instructions that, when executed by one or more of the one or more user device processors 102, cause the one or more user device processors 102 to perform an operation described herein. In examples, instructions 108 can be those of a mobile application (e.g., that may be obtained from a mobile application store, such as the APPLE APP STORE or the GOOGLE PLAY STORE). The mobile application can provide a user interface for receiving user input from a user and acting in response thereto. User interface 104 can further provide output to the user. In some examples, client instructions 108 are instructions that cause a web browser of user device 100 to render a web page associated with a process described herein. The web page may present information to the user and be configured to receive input from the user and take actions in response thereto.

Other device 120 may be a self-service kiosk, a computer terminal, a dedicated transactions terminal-such as an electronic payment terminal, an automated customer interaction machine or device-such as an Automated Teller Machine (ATM), and the like.

In the illustrated example, other device 120 includes one or more other device processors 122, other device memory 124, and other device interface 130.

The one or more other device processors 122 are one or more components of other device 120 that execute instructions, such as instructions that obtain data, process the data, and provide output based on the processing. The one or more other device processors 122 can include one or more aspects described below in relation to the one or more processors 912 of FIG. 9.

Other device memory 124 is a collection of one or more components of other device 120 configured to store instructions and data for later retrieval and use. Other device memory 120 can include one or more aspects described below in relation to memory 914 of FIG. 9. Other device memory 120 can store other device instructions 126.

Other device instructions 126 are instructions that, when executed by the one or more processors 122, cause the one or more processors 122 to perform one or more operations described elsewhere herein.

The one or more other device interfaces 130 are one or more components of other device 120 that facilitate receiving input from and providing output to something external to other device 120. The one or more other device interfaces 130 can include one or more aspects described below in relation to the one or more interfaces 918 of FIG. 9.

Server 150 is a server device that functions as part of one or more processes described herein. In the illustrated example, server 150 includes one or more server processors 152, one or more server interfaces 154, and server memory 150, among other components.

The one or more server processors 152 are one or more components of server 150 that execute instructions, such as instructions that obtain data, process the data, and provide output based on the processing. The one or more server processors 152 can include one or more aspects described below in relation to the one or more processors 912 of FIG. 9.

The one or more server interfaces 154 are one or more components of server 150 that facilitate receiving input from and providing output to something external to server 150. The one or more server interfaces 154 can include one or more aspects described below in relation to the one or more interfaces 918 of FIG. 9.

Server memory 150 is a collection of one or more components of server 150 configured to store instructions and data for later retrieval and use. Server memory 150 can include one or more aspects described below in relation to memory 914 of FIG. 9. Server memory 150 can store server instructions 158.

Server instructions 158 are instructions that, when executed by the one or more processors 152, cause the one or more processors 152 to perform one or more operations described elsewhere herein.

Network 190 is a set of devices that facilitate communication from a sender to a destination, such as by implementing communication protocols. Example networks 190 include local area networks, wide area networks, intranets, and the Internet.

Figure 2:
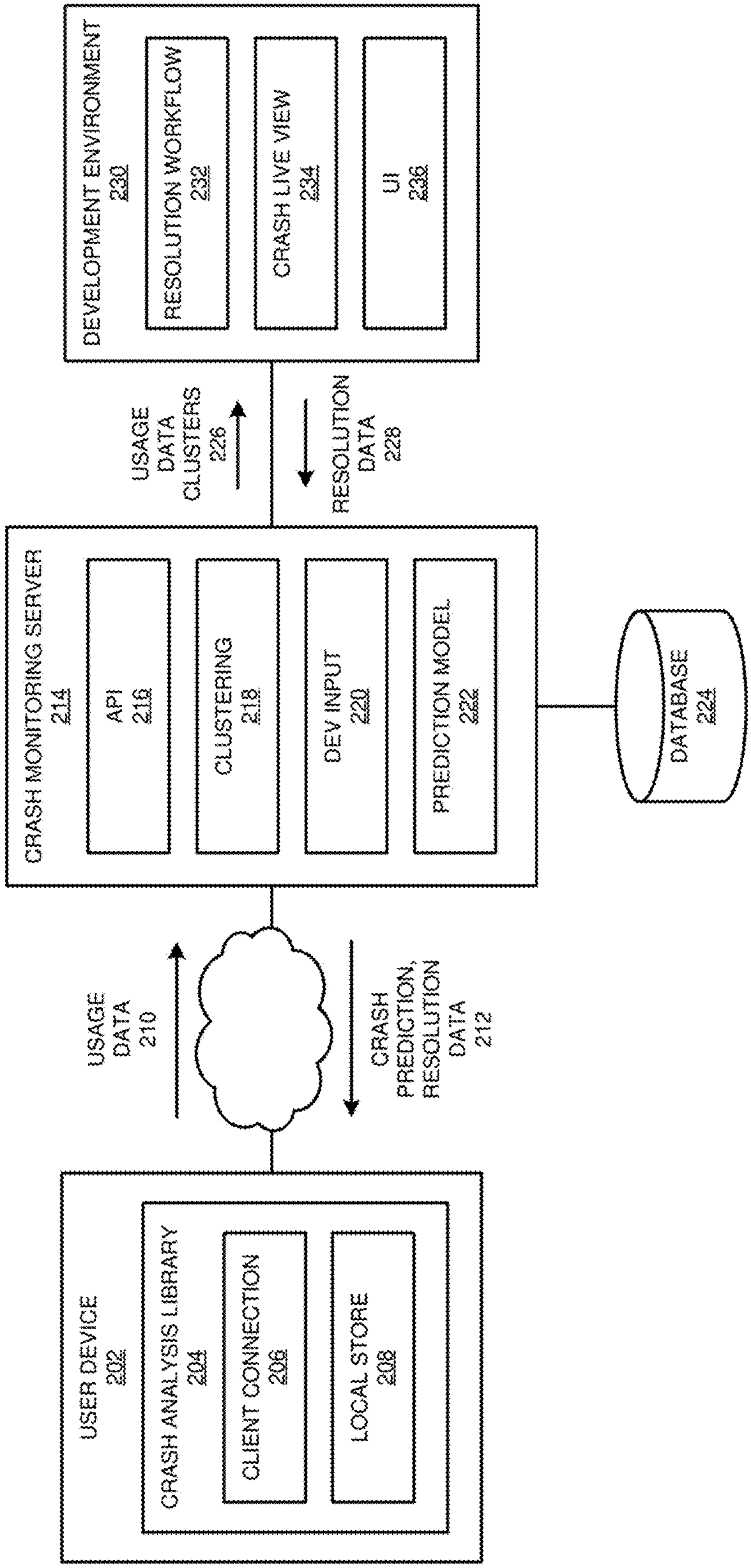
FIG. 2 depicts a block diagram of an architecture for predictive app failure mitigation and remediation in accordance with an illustrative embodiment.

FIG. 2 depicts a block diagram of an architecture for predictive app failure mitigation and remediation in accordance with an illustrative embodiment. Architecture 200 includes a client-side component operating in user device 202, and one or more server-side components operating in crash monitoring server 214 and development environment 230. The code for client-side component operating in user device 202 can be implemented as user device instructions 108 in FIG. 1. The code for server-side components operating in crash monitoring server 214 and development environment 230 can be implemented as server instructions 158 in FIG. 1, which may be distributed across one or more server systems.

Crash analysis library 204, according to an embodiment, is an SDK that can be integrated with an app (not shown) that is configured to operate on user device 202 and is monitored for crash mitigation and remediation in accordance with an illustrative embodiment. Crash analysis library 204 includes at least client connection component 206 and local store 208. Crash analysis library 204 may include additional components (not shown), such as a component to present a UI for interactively displaying crash mitigation and remediation information as described herein, and a component to integrate with the monitored app for passing through any user inputs.

Client connection 206 implements a telemetry data collection subcomponent, and may optionally interface with an existing telemetry data collection component (not shown) in user device 202. Client connection component 206, using the telemetry data collection subcomponent, is capable of collecting and forwarding a variety of data items (collectively referred to herein as "usage data" 210) from the use of a monitored app. Local store 208 maintains a repository of usage data 210 over a historical window of time. The window may be reset periodically, upon app update, upon SDK update, or by any other suitable mechanism.

In one embodiment, usage data 210 includes the following data sets to facilitate crash mitigation, abnormal behavior reporting, and crash reporting:

Navigation path data that records each screen or view the user traverses, including timestamps, user actions, and navigation parameters. This data identifies the sequence of operations leading to a crash or abnormal event.

Stack trace data that is generated when the application terminates unexpectedly or throws an exception. The stack trace shows the call hierarchy and the precise code location of the failure.

Application metadata, such as the current app version, build number, and bundle identifier, which allows crashes to be grouped by release.

Device context information, including operating-system version, device model, available memory, CPU utilization, and network conditions at the time of the event. This context helps correlate crashes with specific hardware or software environments.

User input events (button taps, form entries, gestures) that accompany the navigation flow and may trigger abnormal behavior.

UI state snapshots, such as the current screen layout or displayed data, which can be useful for reproducing crashes or visual anomalies.

Performance metrics such as frame render times, background task durations, and garbage-collection pauses that indicate potential performance degradation preceding a crash.

A data communication component in library 204 transmits usage data 210 to crash monitoring server 214, e.g., via API 216. In one embodiment, usage data 210 may be transmitted in real-time as an error, crash, or anomalous behavior observed by library 204 in a monitored app on user device 202.

At crash monitoring server 214, usage data 210 is combined with other usage data received from any number of other user devices of different types and operating a variety of monitored apps. API 216 receives usage data 210 from multiple user devices 202, each device generating telemetry that reflects the operation of one or more monitored apps. The incoming data stream is then forwarded to the clustering component 218, which partitions the volume of usage data according to shared characteristics or feature vectors such as navigation paths, app version, device model, and performance metrics. These examples of features for clustering are not intended to be limiting. From this disclosure, those of ordinary skill in the art will be able to conceive many other characteristics and features of usage data that are usable for forming clusters of similar usage data, and the same are contemplated within the scope of the illustrative embodiments.

Furthermore, clustering the usage data is an optional action in one embodiment. usage data may be input into a prediction model without clustering to obtain a crash prediction likelihood, as described herein. Clustering allows a crash or abnormal behavior situation to be presented to the development environment with increased urgency because more than one user's usage data shows the user impact. The larger the cluster, the higher the priority that is assigned to resolving the associated issue. In other words, clustering is helpful because the cluster size can directly cause a change in the priority of developing a fix. Similarly, even though a single item of usage data can be presented to a crash prediction model for determining a crash likelihood, presenting an item of usage data in a cluster of similar usage data causes a model to adjust the likelihood of crash based on not a single data point but a plurality of data points. An accuracy of the likelihood of crash is improved when the prediction model sees a cluster of usage data which may show slight variations in their respective features, and a machine learning process adjusts the outcome based on the variations.

Information describing a fix, correction, remedy, solution, or instruction that has been developed, is being developed, or is planned to be developed, by a developer for a crash or abnormal behavior of an app is referred to herein as resolution data. Development input ("dev input") component 220 receives resolution data 228 that has been generated by engineering workflows working on crash or abnormal behaviors from past usage data. Dev input component 220 associates appropriate resolution data 228 with the appropriate cluster of usage data based on the type of crash or behavior identified in the cluster and resolution data 228, ensuring that only relevant resolutions are considered for that group. Prediction model 222 consumes a cluster of usage data and its associated resolution data as input, applies a supervised or unsupervised predictive algorithm, and produces an output that includes a crash likelihood score for that cluster. This crash likelihood metric is then used downstream to trigger user-facing notifications or to inform further engineering actions.

In one embodiment, the clustering operation operates in the following non-limiting example manner: clustering component 218 receives raw usage data 210 that includes navigation traces, stack traces, app metadata, and user input events. Clustering component 218 extracts feature vectors from each usage record, for example, a navigation vector that encodes the sequence of screens or API calls, a crash vector that captures the presence or absence of crash signatures, an app vector that contains demographic attributes such as app version and device model, and a user-input vector that summarizes the types and frequency of user interactions. These feature vectors are normalized and concatenated into a composite feature representation for each usage instance. Clustering component 218 then applies a clustering algorithm, such as k-means, hierarchical clustering, or density-based spatial clustering, to partition the composite feature space. The clustering algorithm groups usage instances that exhibit high similarity in specific characteristics, such as similar navigation paths, similar crash signatures, overlapping app demographic attributes, and comparable user-input patterns. The resulting clusters are labeled (e.g., "navigation-based usage cluster," "crash-type-based usage cluster," "app-based usage cluster") and forwarded to downstream modules for crash likelihood prediction and resolution forecasting. This manner of clustering usage data enables the embodiment to associate specific app behavior patterns with known crash scenarios and available resolutions and determine a crash risk accordingly.

prediction model 222 is built as a supervised learning module that consumes clustered usage data together with any available resolution data for the same cluster and outputs a probability that a user will encounter a crash while following that usage pattern. In one example embodiment, the model used as prediction model 222 may be a classification model that maps a feature vector to a binary outcome (crash likely/crash not likely) or to a continuous crash-likelihood score with a varying degree of likelihood, such as over an example range from 0 to 1. Some types of models that may be used as prediction model 222 include gradient-boosted decision trees, random forests, or a multilayer perceptron, because they handle mixed data types (categorical navigation steps, numeric performance metrics) and can be trained efficiently on the size of data that the backend can ingest from many devices.

A model used as a crash prediction model 222 can be trained as follows-A usage-data cluster corresponds to a feature vector corresponding to a specific characteristic related to the app behavior. For example, a navigation vector that encodes the sequence of screens or API calls, a crash vector that indicates the presence or absence of known crash signatures, an app vector that includes version, device model, and OS, and a user-input vector that summarizes the type and frequency of user actions. Resolution data, such as the current fix status, the target resolution date, and the resolution type, is appended as additional features so the model can learn how the presence of an active fix influences the likelihood of a crash. The combined feature set is then labeled with the outcome observed for the corresponding app behavior (crash or no crash, normal or abnormal behavior) to create a dataset. The dataset may be stored in database 224.

The model is trained on a historical dataset formed and gathered from crash monitoring server 214, such as from database 224. The data are split into training and validation subsets. During training, the model learns weights (tree splits or neural network weights) that maximize the predictive accuracy of crash outcomes. Cross-validation and hyperparameter optimization are performed to prevent overfitting. The resulting model is stored as a serialized artifact that can be deployed as a crash prediction model.

A trained prediction model 222 operates on live usage data at runtime as follows-When a new usage data 210 arrives at server 214, clustering component 218 clusters the usage data into an appropriate cluster. The cluster, together with any real-time resolution metadata, forms the input to prediction model 222. Model 222 returns a crash-likelihood score and optionally a confidence value associated with the crash-likelihood score.

Development environment 230 includes one or more workflows 232, each of which may be related to the software development work for resolving a crash or abnormal behavior scenario in an app. Workflow 232 is configured to output resolution data 228 pertaining to the crash or behavior.

Crash live view 234 may be a development-side view or presentation of progress being made towards a forecasted completion of work on a fix for a crash or abnormal behavior of an app. Crash live view 234 may contribute data to resolution data 228. UI 236 may be a development dashboard to show development progress, incoming crash information in user data clusters, and the like.

The likelihood output and the optional confidence value in the likelihood, as pertains to the crash or abnormal behavior of an app (collectively, "crash prediction"), form a part of data 212 that is returned to user device 202. Any available resolution data related to the crash or abnormal behavior is also returned in data 212. If the likelihood exceeds a configurable threshold, the crash analysis library 204 on the user device 202 triggers a notification to the user and provides an update to the user on the likelihood of an impending crash or abnormal behavior, together with a forecast of possible forthcoming resolution.

Figure 3:
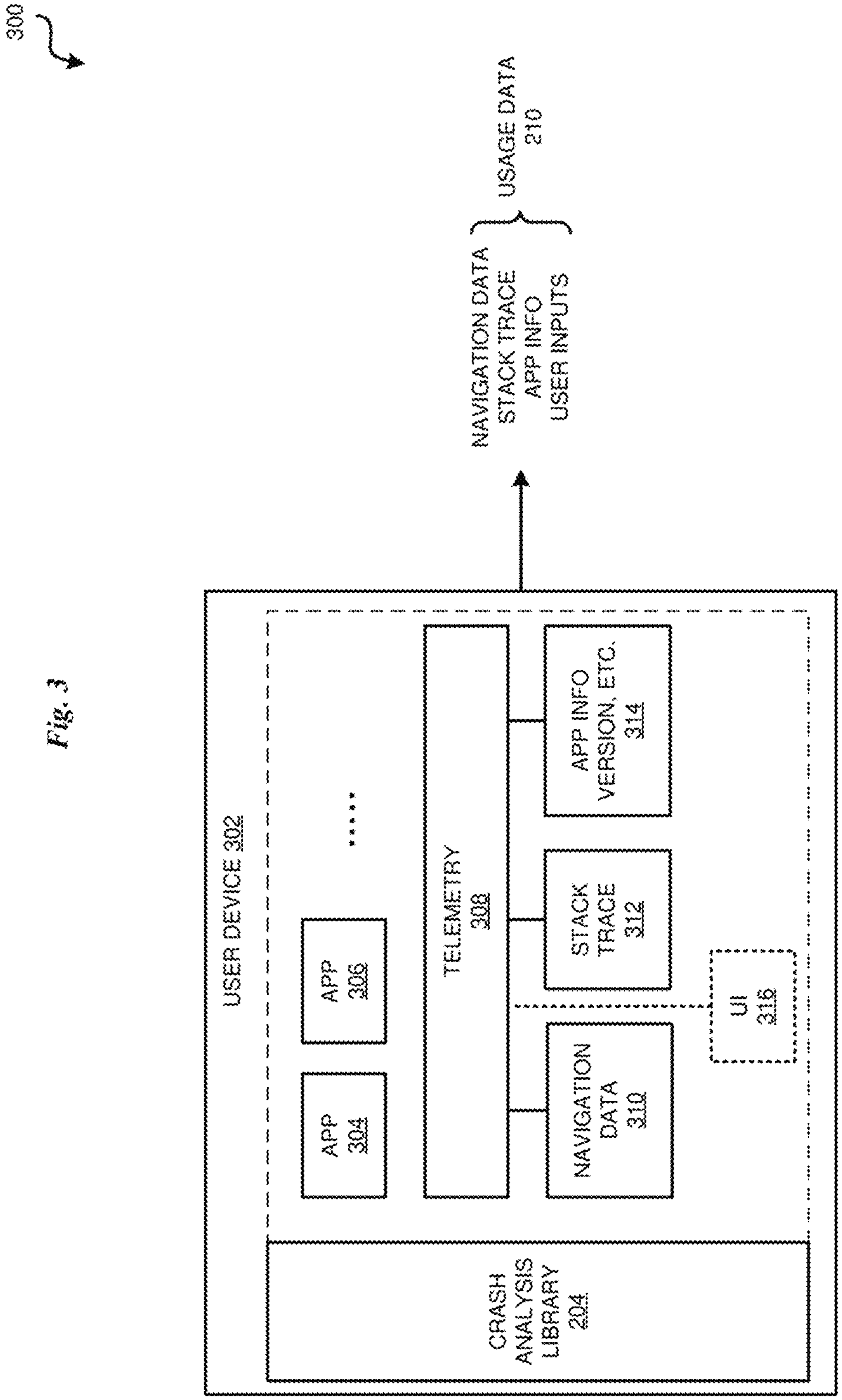
FIG. 3 depicts a user-device-side configuration for predictive app failure mitigation and remediation in accordance with an illustrative embodiment.

FIG. 3 depicts a user-device-side configuration for predictive app failure mitigation and remediation in accordance with an illustrative embodiment. Configuration 300 depicts an example integration in user device 302. crash analysis library 204 has been described with respect to FIG. 2.

Library 204 integrates with one or more apps, such as app 304 and 306, operating on user device 302. Library 204 integrates with telemetry instrumentation 308, which includes both pre-existing in user device 302 as well as that provided in client connection 206. Telemetry 308 collects, among other data described herein, user's UI navigation data 310, stack trace data 312 (which includes sequence of function or method calls that were active at the time the fault occurred, typically including the name of each function, the source file or class, and the line number where the call was made), app demographic data 314 (which includes the name, version, release info, OS compatibility, and other similar data). Telemetry 308 may optionally provide a UI interface for the user to interact with the telemetry data. Library 204 outputs usage data 210, which is described with respect to FIG. 2. Usage data 210 includes but is not limited to navigation data, stack trace, app demographic info, and user input.

In an example operation, app 304 receives user interaction events from user device 302. telemetry 308 collects navigation data 310, stack trace 312, app info 314, from the operation of app 304 on user device 302. navigation data 310 represents the sequence of screens or screens navigated by the user, encoded as a list of screen identifiers and timestamps. Stack trace 312 is captured when the application encounters an exception, recording the call stack at the point of failure. App info 314 includes application version, build number, OS information, and the like. User inputs data in usage data 210 includes a record of user actions such as button taps, text entries, and gesture recognitions, each tagged with a timestamp and event type.

Figure 4:
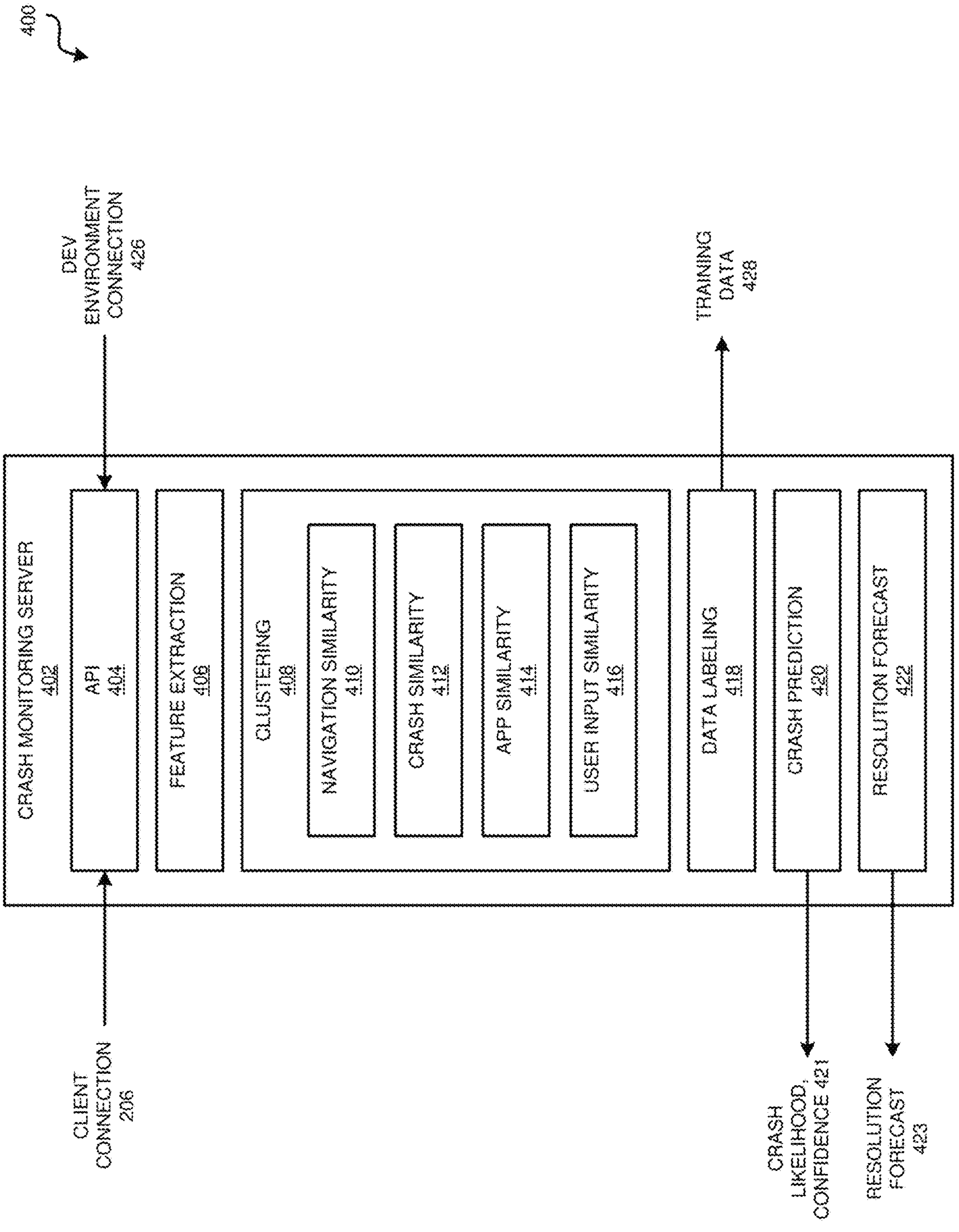
FIG. 4 depicts a crash monitoring server configuration in accordance with an illustrative embodiment.

FIG. 4 depicts a crash monitoring server configuration in accordance with an illustrative embodiment. Configuration 400 can be implemented as a crash monitoring server 214 in FIG. 2.

Crash monitoring server 402 receives usage data 210 from client connection 206. Crash monitoring server 402 exposes set 404 of APIs for data communication from client connection 206 in connected user devices. An API in a set of APIs 404 is also used to obtain resolution data over the dev environment connection 426.

Usage data 210 is processed by feature extraction component 406 in a manner described herein, which derives feature vectors such as navigation vectors, crash vectors, and app vectors from raw usage data. Without implying a limitation thereto, feature extraction component 406 may, among other suitable methods, employ static analysis of navigation sequences, extraction of stack trace symbols, and collection of device attributes.

Clustering component 408 groups usage data 210 based on multiple similarity measures. Navigation similarity component 410 compares and clusters usage data from various apps, users, and user devices according to similarities in their navigation vectors; crash similarity component 412 similarly compares and clusters by similarities in crash vectors; app similarity component 414 compares and clusters by similarities in application demographic data; user input similarity component 416 compares and clusters by similarities in user inputs. Each similarity measure produces a distance metric, and clustering 408 groups usage data into clusters that share high similarity across these dimensions. These examples of similarities and corresponding vectors are not intended to be limiting. From this disclosure, those of ordinary skill in the art will be able to conceive many other characteristics over which to determine similarities for clustering usage data, and the same are contemplated within the scope of the illustrative embodiments.

Data labeling component 418 associates labels with the data items in a cluster to produce training dataset 428, as described herein. Crash prediction model 420 implements a suitable model as described earlier, trained on a data similar to labeled data 428. as input, model 420 receives a cluster of user data and corresponding resolution data, and output (421) a crash likelihood score and a confidence metric for each data item in that cluster, i.e., for each individual usage data that is reported by a single user device.

In addition to crash prediction model 420, resolution forecast model 422 performs a regression or time-to-resolution calculation based on the resolution data accompanying the cluster. Resolution forecast model 422 takes as input the crash likelihood output from crash prediction model 422 and the current resolution data corresponding to the cluster or group of similar usage data reporting a type of crash or behavior. Resolution forecast model 422 produces output (423) which includes an estimated resolution timeline, a current resolution status indicator, a possible workaround until resolution if one is provided in the resolution data, or some combination thereof.

Figure 5:
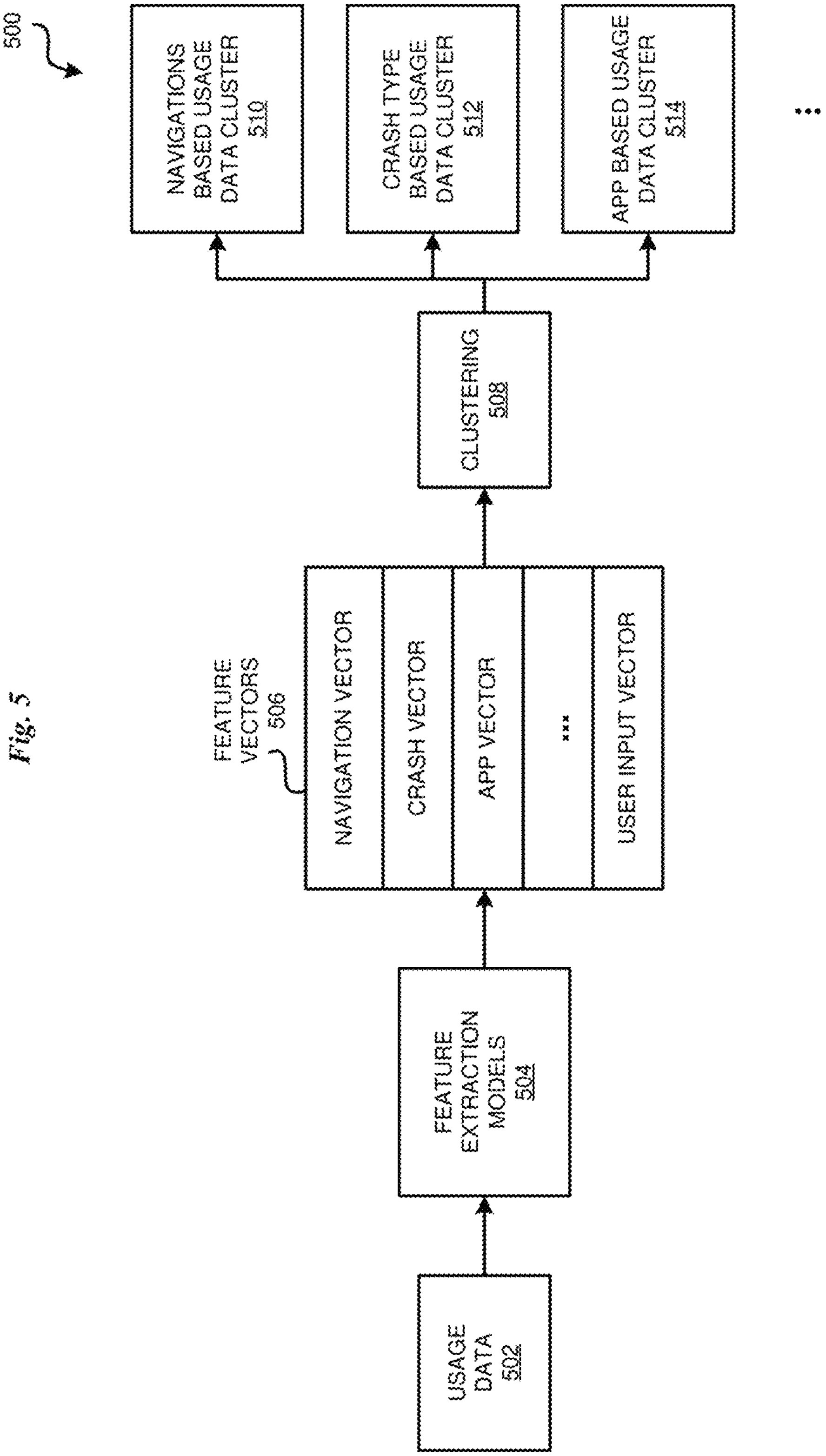
FIG. 5 depicts a clustering process flow in accordance with an illustrative embodiment.

FIG. 5 depicts a clustering process flow in accordance with an illustrative embodiment. Flow 500 can be implemented in clustering component 408 in FIG. 4.

Usage data 502 is a collection of usage data 210 received from one or more user devices concerning the crash or behavior of one or more apps executing thereon. Feature extraction models 504 are a set of algorithms or machine learning models that transform usage data 502 into numeric feature vectors 506, each vector representing a similarity characteristic as described herein, such as a navigation vector based on the navigation attributes in usage data 502, a crash vector based on the stack data attributes and/or crash identifiers at crash in usage data 502, app vector 506 based on app metadata or demographic data attributes in usage data 502, user input vector 506 based on the user inputs attributes in usage data 502.

The clustering operation groups the various individual usage data into clusters according to their vector-based similarities. For example, navigations-based usage data cluster 510 contains those individual items of usage data whose navigation vectors are similar to one another according to a similarity criterion and similarity threshold. Similarly, crash-type-based usage data cluster 512 those individual items of usage data whose crash vectors are similar to one another according to a similarity criterion and similarity threshold. App-based usage data cluster 514 contains those individual items of usage data feature vectors that are similar to one another according to a similarity criterion and a similarity threshold.

Figure 6:
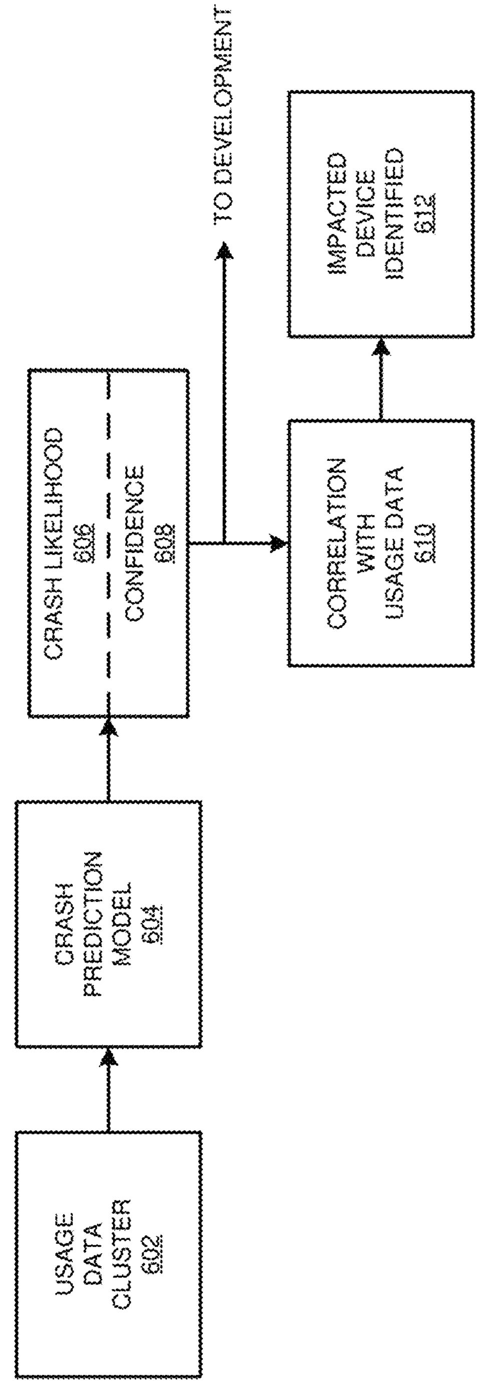
FIG. 6 depicts a process flow of crash prediction reporting for mitigation and remediation in an illustrative embodiment.

FIG. 6 depicts a process flow of crash prediction reporting for mitigation and remediation in an illustrative embodiment. Process flow 600 can be implemented in the crash monitoring server 402 in FIG. 4.

The crash prediction model 604 is similar to model 420 in FIG. 4 and receives as input usage data cluster 602. Model 604 processes a usage data item from cluster 602 to produce crash likelihood score 606 and confidence value 608. crash likelihood score 606 represents the probability that the data contents in the usage data item, such as a user's current navigation path, will result in a crash, while the confidence 608 reflects the model's certainty regarding that probability.

Score 606 and confidence value 608 are correlated (610) back to the usage data item in order to determine the impacted device (612). Identified impacted device 612 is then targeted for sending the crash likelihood score 606 and optionally the corresponding confidence value 608. A crash analysis library, e.g., library 204 in FIG. 2, receives this data and presents it to the user as a mitigation of an impending crash if the user continues the captured course of navigation through the app.

Figure 7:
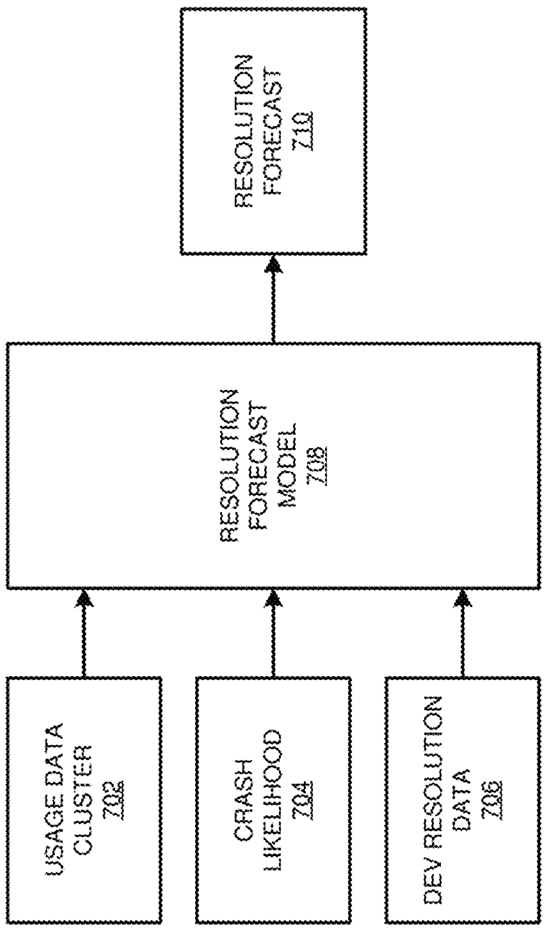
FIG. 7 depicts a resolution forecasting configuration in accordance with an illustrative embodiment.

FIG. 7 depicts a resolution forecasting configuration in accordance with an illustrative embodiment. Configuration 700 can be implemented in crash monitoring server 402 in FIG. 4 using model 422 in FIG. 4.

Resolution forecast model 708 receives the usage data cluster 702 and crash likelihood score 704, which is the crash probability output from the crash prediction model 604 in FIG. 6, corresponding to a usage data item cluster 702. Model 708 also receives as input resolution data 706 corresponding to cluster 702. Resolution data 706 contains the current status of a fix, a target resolution date, and any alternate user actions that are available for the app issue identified in usage data cluster 702.

Resolution forecast model 708 generates a resolution forecast 710. For example, in one embodiment, resolution forecast model 708 processes the inputs using a probabilistic or regression algorithm. Model 708 estimates the time remaining until the fix is deployed. Model 708 may be optionally trained to also predict the likelihood that the resolution will be successful. The output of resolution forecast model 702 is resolution forecast 710, which includes an estimated resolution date, an optional confidence value, and a status indicator indicating the current status of the resolution.

resolution forecast 710 is communicated to user device 202 to a notification subsystem therein. Resolution forecast 710 is used to display live resolution information to users and to trigger real-time notifications that inform affected users of the current status of the fix and any alternative actions the users can take to avoid or mitigate an app crash or abnormal behavior.

As dev resolution data 706 is updated by engineering teams, the resolution forecast can be updated and retransmitted to the user device. The updates can include changes to the target resolution date, the status of the fix, and new alternate actions.

FIG. 8 depicts a process for predictive app failure mitigation and remediation in accordance with an illustrative embodiment. Process 800 can be implemented using configuration 200 in FIG. 2. The process collects usage data (block 802). The process classifies usage data according to key indications and salient features (block 804). The process creates clusters of usage data according to those features (block 806). The process predicts the likelihood of a crash according to a feature in a cluster of usage data at (block 808). The process correlates crash likelihood back with usage data (block 810). The process identifies the impacted device (block 812).

Simultaneously, the process obtains resolution data for one or more issues (block 814). The process generates a resolution forecast for a likely crash scenario (block 816). The process sends a notification of crash likelihood and resolution forecast (block 818). The process ends thereafter.

Figure 9:
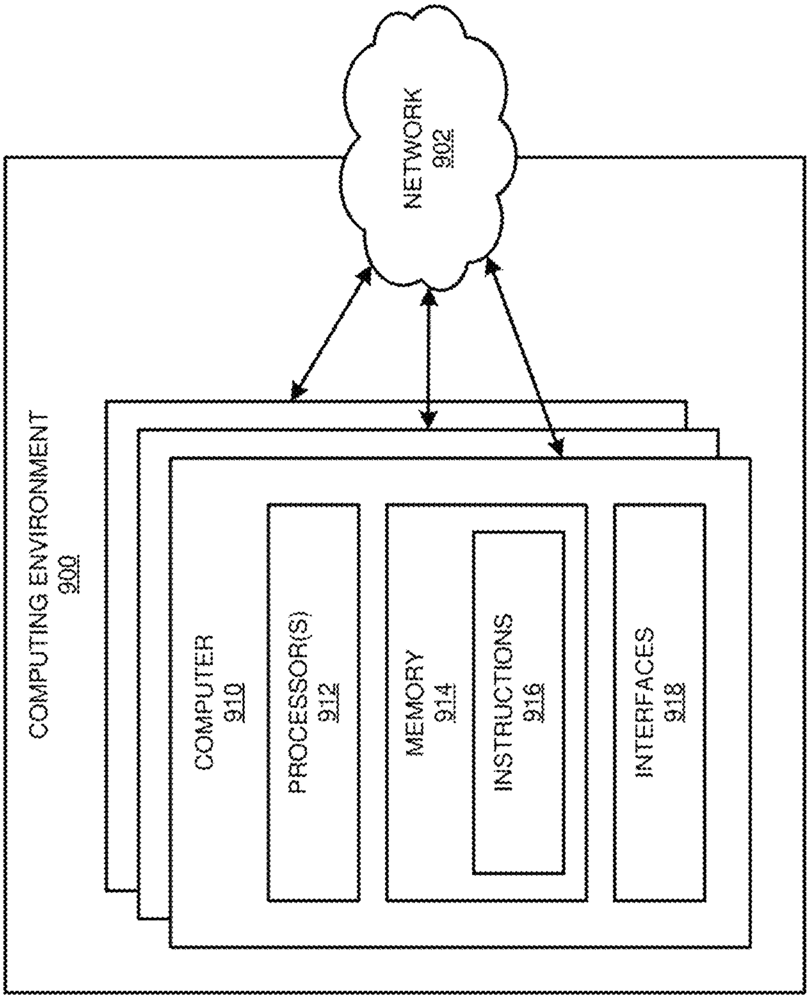
FIG. 9 depicts a data processing environment in which aspects of the present disclosure may be implemented.

FIG. 9 depicts a data processing environment 20 in which aspects of the present disclosure may be implemented. Computing environment 900 is a set of one or more virtual or physical computers 910 that individually or in cooperation achieve tasks, such as implementing one or more aspects described herein. Computers 910 have components that cooperate to cause output based on input. Example computers 910 include desktops, servers, mobile devices (e.g., smart phones and laptops), wearables, virtual reality devices, augmented reality devices, expanded reality devices, spatial computing devices, virtualized devices, other computers, or combinations thereof. In particular example implementations, computing environment 900 includes at least one physical computer.

Computing environment 900 may specifically be used to implement one or more aspects described herein. In some examples, one or more of computers 910 may be implemented as a user device, such as a mobile device, and others of computers 910 may be used to implement aspects of a machine learning framework usable to train and deploy models exposed to the mobile device or provide other functionality, such as through exposed application programming interfaces.

Computing environment 900 can be arranged in any of a variety of ways. Computers 910 can be local to or remote from other computers 910 of environment 900. Computing environment 900 can include computers 910 arranged according to client-server models, peer-to-peer models, edge computing models, other models, or combinations thereof.

In many examples, computers 910 are communicatively coupled with devices internal or external to computing environment 900 via network 902. Network 902 is a set of devices that facilitate communication from a sender to a destination, such as by implementing communication protocols. Example networks 902 include local area networks, wide area networks, intranets, or the Internet.

In some implementations, computers 910 can be general-purpose computing devices (e.g., consumer computing devices). In some instances, via hardware or software configuration, computers 910 can be special purpose computing devices, such as servers able to practically handle large amounts of client traffic, machine learning devices able to practically train machine learning models, data stores able to practically store and respond to requests for large amounts of data, other special purposes computers, or combinations thereof. The relative differences in capabilities of different kinds of computing devices can result in certain devices specializing in certain tasks. For instance, a machine learning model may be trained on a powerful computing device and then stored on a relatively lower powered device for use.

Many example computers 910 include one or more processors 912, memory 914, and one or more interfaces 918. Such components can be virtual, physical, or combinations thereof.

The one or more processors 912 are components that execute instructions, such as instructions that obtain data, process the data, and provide output based on the processing. The one or more processors 912 often obtain instructions and data stored in memory 914. The one or more processors 912 can take any of a variety of forms, such as central processing units, graphics processing units, coprocessors, tensor processing units, artificial intelligence accelerators, microcontrollers, microprocessors, application-specific integrated circuits, field programmable gate arrays, other processors, or combinations thereof. In example implementations, the one or more processors 912 include at least one physical processor implemented as an electrical circuit. Example providers of processors 912 include INTEL, AMD, QUALCOMM, TEXAS INSTRUMENTS, and APPLE.

Memory 914 is a collection of components configured to store instructions 916 and data for later retrieval and use. Instructions 916 can, when executed by the one or more processors 912, cause execution of one or more operations that implement aspects described herein. In many examples, memory 914 is a non-transitory computer readable medium, such as random-access memory, read only memory, cache memory, registers, portable memory (e.g., enclosed drives or optical disks), mass storage devices, hard drives, solid state drives, other kinds of memory, or combinations thereof.

The one or more interfaces 918 are components that facilitate receiving input from and providing output to something external to computer 910, such as visual output components (e.g., displays or lights), audio output components (e.g., speakers), haptic output components (e.g., vibratory components), visual input components (e.g., cameras), auditory input components (e.g., microphones), haptic input components (e.g., touch or vibration sensitive components), motion input components (e.g., mice, gesture controllers, finger trackers, eye trackers, or movement sensors), buttons (e.g., keyboards or mouse buttons), position sensors (e.g., terrestrial or satellite-based position sensors such as those using the Global Positioning System), other input components, or combinations thereof (e.g., a touch sensitive display). The one or more interfaces 918 can include components for sending or receiving data from other computing environments or electronic devices, such as one or more wired connections (e.g., Universal Serial Bus connections, THUNDERBOLT connections, ETHERNET connections, serial ports, or parallel ports) or wireless connections (e.g., via components configured to communicate via radiofrequency signals, such as according to WI-FI, cellular, BLUETOOTH, ZIGBEE, or other protocols). One or more of the one or more interfaces 918 can facilitate connection of computing environment 900 to network 990.

Computers 910 can include any of a variety of other components to facilitate performance of operations described herein. Example components include one or more power units (e.g., batteries, capacitors, power harvesters, or power supplies) that provide operational power, one or more busses to provide intra-device communication, one or more cases or housings to encase one or more components, other components, or combinations thereof.

A person of skill in the art, having benefit of this disclosure, may recognize various ways for implementing technology described herein, such as by using any of a variety of programming languages (e.g., a C-family programming language, PYTHON, JAVA, RUST, HASKELL, other languages, or combinations thereof), libraries or packages (e.g., that provide functions for obtaining, processing, and presenting data, such as may be obtained using a package manager like PIP or CONDA), compilers, and interpreters to implement aspects described herein. Example libraries include NLTK (Natural Language Toolkit) by Team NLTK (providing natural language functionality), PYTORCH by META (providing machine learning functionality), NUMPY by the NUMPY Developers (providing mathematical functions), and BOOST by the Boost Community (providing various data structures and functions) among others. Operating systems (e.g., WINDOWS, LINUX, MACOS, IOS, and ANDROID) may provide their own libraries or application programming interfaces useful for implementing aspects described herein, including user interfaces and interacting with hardware or software components. Web applications can also be used, such as those implemented using JAVASCRIPT or another language. A person of skill in the art, with the benefit of the disclosure herein, can use programming tools to assist in the creation of software or hardware to achieve techniques described herein, such as intelligent code completion tools (e.g., INTELLISENSE) and artificial intelligence tools (e.g., GITHUB COPILOT by MICROSOFT or CODE LLAMA by META).

In some examples, large language models can be used to understand natural language, generate natural language, or perform other tasks. Examples of such large language models include CHATGPT by OPENAI, a LLAMA model by META, a CLAUDE model by ANTHROPIC, others, or combinations thereof. Such models can be fine-tuned on relevant data using any of a variety of techniques to improve the accuracy and usefulness of the answers. The models can be run locally on server or client devices or accessed via an application programming interface. Some of those models or services provided by entities responsible for the models may include other features, such as speech-to-text features, text-to-speech, image analysis, research features, and other features, which may also be used as applicable.

Figure 10:
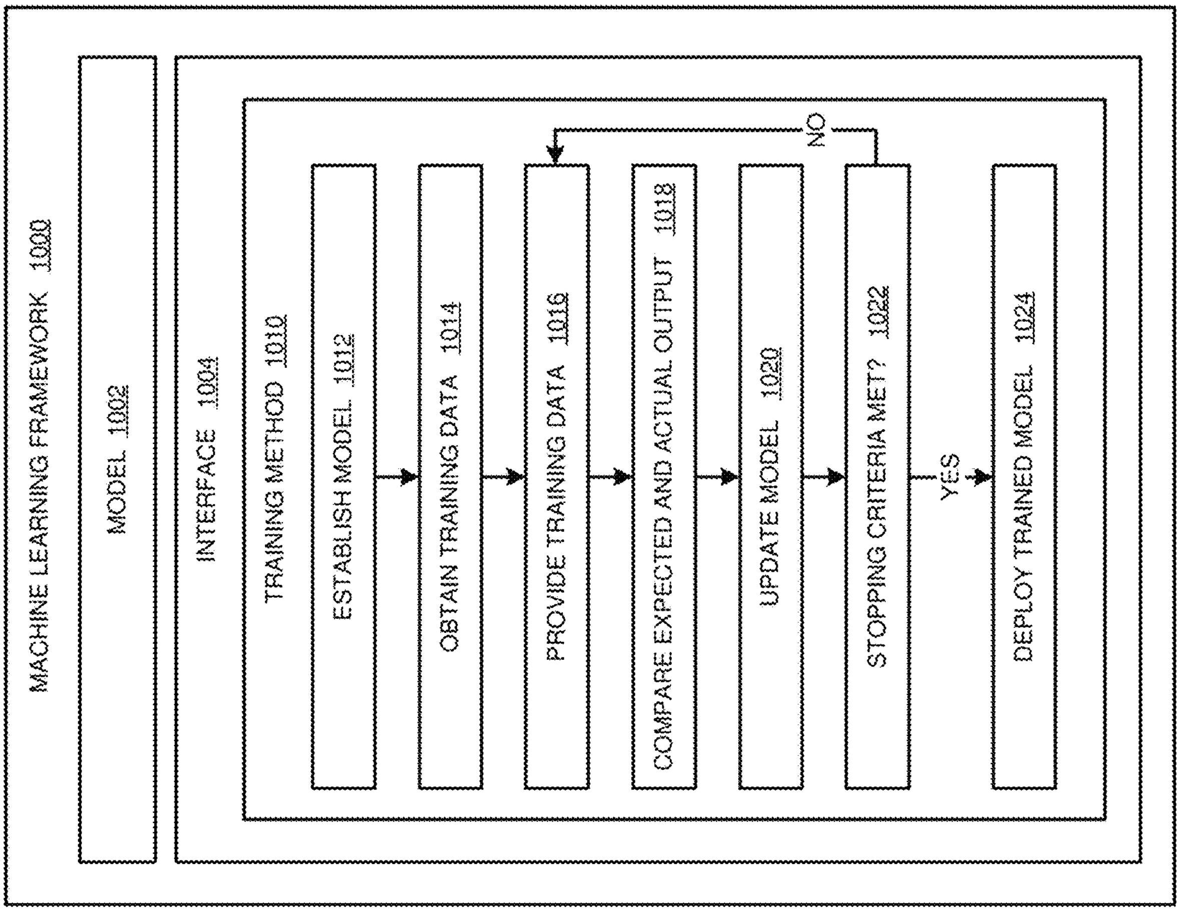
FIG. 10 depicts a configuration for machine learning in which aspects of the present disclosure may be implemented.

FIG. 10 illustrates an example machine learning framework 1000 that techniques described herein may benefit from or improve on. A machine learning framework 1000 is a collection of software and data that implements artificial intelligence trained to provide output, such as predictive data, based on input. Examples of artificial intelligence that can be implemented with machine learning way include neural networks (including recurrent neural networks), language models (including so-called "large language models"), generative models, natural language processing models, adversarial networks, decision trees, Markov models, support vector machines, genetic algorithms, others, or combinations thereof. A person of skill in the art having the benefit of this disclosure will understand that these artificial intelligence implementations need not be equivalent to each other and may instead select from among them based on the context in which they will be used. Machine learning frameworks 1000 or components thereof are often built or refined from existing frameworks, such as TENSORFLOW by GOOGLE, INC., or PYTORCH by the PYTORCH community.

The machine learning framework 1000 can include one or more models 1002 that are the structured representation of learning and an interface 1004 that supports use of the model 1002.

The model 1002 can take any of a variety of forms. In many examples, the model 1002 includes representations of nodes (e.g., neural network nodes, decision tree nodes, Markov model nodes, other nodes, or combinations thereof) and connections between nodes (e.g., weighted, or unweighted unidirectional or bidirectional connections). In certain implementations, the model 1002 can include a representation of memory (e.g., providing long short-term memory functionality). Where the set includes more than one model 1002, the models 1002 can be linked, cooperate, or compete to provide output.

The interface 1004 can include software procedures (e.g., defined in a library) that facilitate the use of the model 1002, such as by providing a way to establish and interact with the model 1002. For instance, the software procedures can include software for receiving input, preparing input for use (e.g., by performing vector embedding, such as using Word2Vec, BERT, or another technique), processing the input with the model 1002, providing output, training the model 1002, performing inference with the model 1002, fine tuning the model 1002, other procedures, or combinations thereof.

In an example implementation, interface 1004 can be used to facilitate a training method 1010 that can include operation 1012. Operation 1012 includes establishing a model 1002, such as initializing a model 1002. The establishing can include setting up the model 1002 for further use (e.g., by training or fine tuning). The model 1002 can be initialized with values. In examples, the model 1002 can be pretrained. Operation 1014 can follow operation 1012. Operation 1014 includes obtaining training data. In many examples, the training data includes pairs of input and desired output given the input. In supervised or semi-supervised training, the data can be prelabeled, such as by human or automated labelers. In unsupervised learning the training data can be unlabeled. The training data can include validation data used to validate the trained model 1002. Operation 1016 can follow operation 1014. Operation 1016 includes providing a portion of the training data to the model 1002. This can include providing the training data in a format usable by the model 1002. The framework 1000 (e.g., via the interface 1004) can cause the model 1002 to produce an output based on the input. Operation 1018 can follow operation 1016. Operation 1018 includes comparing the expected output with the actual output. In an example, this can include applying a loss function to determine the difference between expected and actual. This value can be used to determine how training is progressing. Operation 1020 can follow operation 1018. Operation 1020 includes updating the model 1002 based on the result of the comparison. This can take any of a variety of forms depending on the nature of the model 1002. Where the model 1002 includes weights, the weights can be modified to increase the likelihood that the model 1002 will produce correct output given an input. Depending on the model 1002, backpropagation or other techniques can be used to update the model 1002. Operation 1022 can follow operation 1020. Operation 1022 includes determining whether a stopping criterion has been reached, such as based on the output of the loss function (e.g., actual value or change in value over time). In addition, or instead, whether the stopping criterion has been reached can be determined based on a number of training epochs that have occurred or an amount of training data that has been used. In some examples, satisfaction of the stopping criterion can include If the stopping criterion has not been satisfied, the flow of the method can return to operation 1014. If the stopping criterion has been satisfied, the flow can move to operation 1022. Operation 1022 includes deploying the trained model 1002 for use in production, such as providing the trained model 1002 with real-world input data and produce output data used in a real-world process. The model 1002 can be stored in memory 914 of at least one computer 910, or distributed across memories of two or more such computers 910 for production of output data (e.g., predictive data).

In addition to the depicted components of system 10 in FIG. 1, system 10 can also include many other components including, but not limited to—a public cloud, a private cloud, a gateway, a cloud orchestration module, a computer (which may further include specialized processing circuitry, cache, a communication fabric, a volatile memory, a persistent storage including an operating system, and peripheral devices), Internet of Things (IoT) sensors, a remote database, and a container set.

A device contemplated herein may take the form of a desktop computer, laptop computer, tablet computer, smart phone, smart watch or other wearable computer, mainframe computer, quantum computer or any other form of computer or mobile device now known or to be developed in the future that is capable of running a program, accessing a network or querying a database. As is well understood in the art of computer technology, and depending upon the technology, performance of a computer-implemented method may be distributed among multiple computers and/or between multiple locations. Where the detailed discussion in this disclosure is focused on a single computer, such focus is only to keep the presentation as simple as possible. A computer or device contemplated herein may be located in or participate in a cloud, even though it is not shown in a cloud. On the other hand, a computer or device is not required to participate in a cloud except to any extent as may be affirmatively indicated.

A processor device described herein may be of any type now known or to be developed in the future, may be distributed over multiple packages or coordinated integrated circuit chips, and may implement multiple processor threads and/or multiple processor cores. Cache memory may be located in the processor chip package(s) and is typically used for data or code that should be available for rapid access by the threads or cores running on a processor. Cache memories are typically organized into multiple levels depending upon relative proximity to the processing circuitry. Alternatively, some, or all, of the cache for the processor set may be located "off chip." In some computing environments, a processor may be designed for working with qubits and performing quantum computing.

Computer readable program instructions are typically loaded onto a computing device to cause a series of operational steps to be performed by a processor set of the computing device and thereby effect a computer-implemented method, such that the instructions thus executed will instantiate the methods specified in flowcharts and/or narrative descriptions of computer-implemented methods included in this document (collectively referred to as "the inventive methods"). These computer readable program instructions are stored in various types of computer readable storage media, such as cache and the other storage media discussed below. The program instructions, and associated data, are accessed by the processor set to control and direct performance of the inventive methods. At least some of the instructions for performing the inventive methods may be stored in a persistent storage.

Measured service: cloud systems automatically control and optimize resource use by leveraging a metering capability at some level of abstraction appropriate to the type of service (e.g., storage, processing, bandwidth, and active user accounts). Resource usage can be monitored, controlled, reported, and invoiced, providing transparency for both the provider and consumer of the utilized service.

For the sake of clarity of the description, and without implying any limitation thereto, the illustrative embodiments are described using some example configurations. From this disclosure, those of ordinary skill in the art will be able to conceive many alterations, adaptations, and modifications of a described configuration for achieving a described purpose, and the same are contemplated within the scope of the illustrative embodiments.

Furthermore, simplified diagrams of the data processing environments are used in the figures and the illustrative embodiments. In an actual computing environment, additional structures or components that are not shown or described herein, or structures or components different from those shown but for a similar function as described herein may be present without departing the scope of the illustrative embodiments.

Furthermore, the illustrative embodiments are described with respect to specific actual or hypothetical components only as examples. Any specific manifestations of these and other similar artifacts are not intended to be limiting to the embodiments. Any suitable manifestation of these and other similar artifacts can be selected within the scope of the illustrative embodiments.

The examples in this disclosure are used only for the clarity of the description and are not limiting to the illustrative embodiments. Any advantages listed herein are only examples and are not intended to be limiting to the illustrative embodiments. Additional or different advantages may be realized by specific illustrative embodiments. Furthermore, a particular illustrative embodiment may have some, all, or none of the advantages listed above.

Furthermore, the illustrative embodiments may be implemented with respect to any type of data, data source, or access to a data source over a data network. Any type of data storage device may provide the data to an embodiment, either locally at a data processing system or over a data network, within the scope of the illustrative embodiments. Where an embodiment is described using a mobile device, any type of data storage device suitable for use with the mobile device may provide the data to such embodiment, either locally at the mobile device or over a data network, within the scope of the illustrative embodiments.

The illustrative embodiments are described using specific code, computer readable storage media, high-level features, designs, architectures, protocols, layouts, schematics, and tools only as examples and are not limiting to the illustrative embodiments. Furthermore, the illustrative embodiments are described in some instances using particular software, tools, and data processing environments only as an example for the clarity of the description. The illustrative embodiments may be used in conjunction with other comparable or similarly purposed structures, systems, applications, or architectures. For example, other comparable mobile devices, structures, systems, applications, or architectures therefor, may be used in conjunction with such embodiment within the scope of the illustrative embodiments. An illustrative embodiment may be implemented in hardware, software, or a combination thereof.

The examples in this disclosure are used only for the clarity of the description and are not limiting to the illustrative embodiments. Additional data, operations, actions, tasks, activities, and manipulations will be conceivable from this disclosure and the same are contemplated within the scope of the illustrative embodiments.

Various aspects of the present disclosure are described by narrative text, flowcharts, block diagrams of computer systems and/or block diagrams of the machine logic included in computer program product (CPP) embodiments. With respect to any flowcharts, depending upon the technology involved, the operations can be performed in a different order than what is shown in a given flowchart. For example, again depending upon the technology involved, two operations shown in successive flowchart blocks may be performed in reverse order, as a single integrated step, concurrently, or in a manner at least partially overlapping in time.

A computer program product embodiment ("CPP embodiment" or "CPP") is a term used in the present disclosure to describe any set of one, or more, storage media (also called "mediums") collectively included in a set of one, or more, storage devices that collectively include machine readable code corresponding to instructions and/or data for performing computer operations specified in a given CPP claim. A "storage device" is any tangible device that can retain and store instructions for use by a computer processor. Without limitation, the computer readable storage medium may be an electronic storage medium, a magnetic storage medium, an optical storage medium, an electromagnetic storage medium, a semiconductor storage medium, a mechanical storage medium, or any suitable combination of the foregoing. Some known types of storage devices that include these mediums include: diskette, hard disk, random access memory (RAM), read-only memory (ROM), erasable programmable read-only memory (EPROM or Flash memory), static random access memory (SRAM), compact disc read-only memory (CD-ROM), digital versatile disk (DVD), memory stick, floppy disk, mechanically encoded device (such as punch cards or pits/lands formed in a major surface of a disc) or any suitable combination of the foregoing. A computer readable storage medium, as that term is used in the present disclosure, is not to be construed as storage in the form of transitory signals per se, such as radio waves or other freely propagating electromagnetic waves, electromagnetic waves propagating through a waveguide, light pulses passing through a fiber optic cable, electrical signals communicated through a wire, and/or other transmission media. As will be understood by those of skill in the art, data is typically moved at some occasional points in time during normal operations of a storage device, such as during access, de-fragmentation or garbage collection, but this does not render the storage device as transitory because the data is not transitory while it is stored.

The following definitions and abbreviations are to be used for the interpretation of the claims and the specification. As used herein, the terms "comprises," "comprising," "includes," "including," "has," "having," "contains" or "containing," or any other variation thereof, are intended to cover a non-exclusive inclusion. For example, a composition, a mixture, process, method, article, or apparatus that comprises a list of elements is not necessarily limited to only those elements but can include other elements not expressly listed or inherent to such composition, mixture, process, method, article, or apparatus.

Additionally, the term "illustrative" is used herein to mean "serving as an example, instance or illustration." Any embodiment or design described herein as "illustrative" is not necessarily to be construed as preferred or advantageous over other embodiments or designs. The terms "at least one" and "one or more" are understood to include any integer number greater than or equal to one, i.e., one, two, three, four, etc. The terms "a plurality" are understood to include any integer number greater than or equal to two, i.e., two, three, four, five, etc. The term "connection" can include an indirect "connection" and a direct "connection."

References in the specification to "one embodiment," "an embodiment," "an example embodiment," etc., indicate that the embodiment described can include a particular feature, structure, or characteristic, but every embodiment may or may not include the particular feature, structure, or characteristic. Moreover, such phrases are not necessarily referring to the same embodiment. Further, when a particular feature, structure, or characteristic is described in connection with an embodiment, it is submitted that it is within the knowledge of one skilled in the art to affect such feature, structure, or characteristic in connection with other embodiments whether or not explicitly described.

The terms "about," "substantially," "approximately," and variations thereof, are intended to include the degree of error associated with measurement of the particular quantity based upon the equipment available at the time of filing the application. For example, "about" can include a range of ±9% or 5%, or 2% of a given value.

The descriptions of the various embodiments have been presented for purposes of illustration but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments described herein.

The descriptions of the various embodiments have been presented for purposes of illustration but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments described herein.

Thus, a computer implemented method, system or apparatus, and computer program product are provided in the illustrative embodiments for managing participation in online communities and other related features, functions, or operations. Where an embodiment or a portion thereof is described with respect to a type of device, the computer implemented method, system or apparatus, the computer program product, or a portion thereof, are adapted or configured for use with a suitable and comparable manifestation of that type of device.

Where an embodiment is described as implemented in an application, the delivery of the application in a Software as a Service (SaaS) model is contemplated within the scope of the illustrative embodiments. In a SaaS model, the capability of the application implementing an embodiment is provided to a user by executing the application in a cloud infrastructure. The user can access the application using a variety of client devices through a thin client interface such as a web browser (e.g., web-based e-mail), or other light-weight client applications. The user does not manage or control the underlying cloud infrastructure including the network, servers, operating systems, or the storage of the cloud infrastructure. In some cases, the user may not even manage or control the capabilities of the SaaS application. In some other cases, the SaaS implementation of the application may permit a possible exception of limited user-specific application configuration settings.

Embodiments may also be delivered as part of a service engagement with a client corporation, nonprofit organization, government entity, internal organizational structure, or the like. Aspects of these embodiments may include configuring a computer system to perform, and deploying software, hardware, and web services that implement, some or all of the methods described herein. Aspects of these embodiments may also include analyzing the client's operations, creating recommendations responsive to the analysis, building systems that implement portions of the recommendations, integrating the systems into existing processes and infrastructure, metering use of the systems, allocating expenses to users of the systems, and billing for use of the systems. Although the above embodiments each have been described by stating their individual advantages, respectively, present application is not limited to a particular combination thereof. To the contrary, such embodiments may also be combined in any way and number according to the intended deployment of present embodiments without losing their beneficial effects.

Techniques herein may be applicable to improving technological processes of a financial institution, such as technological aspects of transactions (e.g., resisting fraud, entering loan agreements, transferring financial instruments, or facilitating payments). Although technology may be related to processes performed by a financial institution, unless otherwise explicitly stated, claimed inventions are not directed to fundamental economic principles, fundamental economic practices, commercial interactions, legal interactions, or other patent ineligible subject matter without something significantly more.

Where implementations involve personal or corporate data, that data can be stored in a manner consistent with relevant laws and with a defined privacy policy. In certain circumstances, the data can be decentralized, anonymized, or fuzzed to reduce the amount of accurate private data that is stored or accessible at a particular computer. The data can be stored in accordance with a classification system that reflects the level of sensitivity of the data and that encourages human or computer handlers to treat the data with a commensurate level of care.

Where implementations involve machine learning, machine learning can be used according to a defined machine learning policy. The policy can encourage training of a machine learning model with a diverse set of training data. Further, the policy can encourage testing for and correcting undesirable bias embodied in the machine learning model. The machine learning model can further be aligned such that the machine learning model tends to produce output consistent with a predetermined morality. Where machine learning models are used in relation to a process that makes decisions affecting individuals, the machine learning model can be configured to be explainable such that the reasons behind the decision can be known or determinable. The machine learning model can be trained or configured to avoid making decisions based on protected characteristics.

The various embodiments described above are provided by way of illustration only and should not be construed to limit the claims attached hereto. Those skilled in the art will readily recognize various modifications and changes that may be made without following the example embodiments and applications illustrated and described herein, and without departing from the true spirit and scope of the following claims.

What is claimed is:

1. A computer-implemented method, comprising:

executing a data communication code in conjunction with an application programming interface (API) configured to be in communication with a code of a crash analysis library executing at a first device, to receive a first usage data relating to a behavior of an app during an execution on the first device;

extracting from the first usage data a feature related to the behavior;

clustering, based on the feature, the first usage data into a cluster with a second usage data from a second device;

determining that a user input data in the first usage data indicates a state in the app such that a set of additional user input steps after the state will result in a crash, the crash comprising an unexpected termination of the app;

obtaining, from a remote server in response to sending the cluster to the remote server, resolution data related to the feature, wherein the resolution data comprises at least a state of development of code related to the behavior and a workaround configured to operate on the first device and avoid the crash;

predicting, as a score, and by using the first usage data and the resolution data as inputs to a trained prediction model, a likelihood of the crash of the app on the first device; and outputting, causing the crash analysis library to present an interactive user interface (UI) on the first device, the score, the state of development of the code, and the workaround.

2. The computer-implemented method of claim 1, further comprising:

forecasting a resolution timeline using the resolution data and the cluster, wherein the resolution data corresponds to the cluster; and outputting to the first device, the resolution timeline.

3. The computer-implemented method of claim 2, further comprising:

receiving an update to the resolution data;

forecasting a new resolution timeline; and sending to the first device, the new resolution timeline.

4. The computer-implemented method of claim 2, wherein the workaround is configured to operate on the first device until an expiry of the resolution timeline.

5. The computer-implemented method of claim 1, further comprising:

constructing a first feature vector corresponding to the feature using the first usage data;

constructing a second feature vector corresponding to the feature using the second usage data;

determining, as a part of the clustering, that the first feature vector is within a threshold degree of similarity of the second feature vector;

transmitting the cluster to a development environment, wherein the resolution data is responsive to the transmitting and corresponds to the cluster.

6. The computer-implemented method of claim 1, wherein the feature of the first usage data comprises navigation data, wherein the navigation data comprises a path data indicative of a user's navigation path in the app, and wherein the navigation data is up to a point in the app such that a set of additional navigation steps after the path will result in the crash.

7. The computer-implemented method of claim 6, wherein the navigation data comprises a sequence of screen transitions in the app, each screen transition having a corresponding time stamp.

8. The computer-implemented method of claim 1, wherein the user input data comprises at least one input on the UI of the app.

9. The computer-implemented method of claim 8, wherein the user input data comprises a sequence of button taps on the UI, each button tap having a corresponding time stamp.

10. A computer program product comprising one or more computer readable storage media, and program instructions collectively stored on the one or more computer readable storage media, the program instructions executable by a set of one or more processors to cause the set of one or more processors to perform operations comprising:

executing a data communication code in conjunction with an application programming interface (API) configured to be in communication with a code of a crash analysis library executing at a first device, to receive a first usage data relating to a behavior of an app during an execution on the first device;

extracting from the first usage data a feature related to the behavior;

clustering, based on the feature, the first usage data into a cluster with a second usage data from a second device;

determining that a user input data in the first usage data indicates a state in the app such that a set of additional user input steps after the state will result in a crash, the crash comprising an unexpected termination of the app;

obtaining, from a remote server in response to sending the cluster to the remote server, resolution data related to the feature, wherein the resolution data comprises at least a state of development of code related to the behavior and a workaround configured to operate on the first device and avoid the crash;

predicting, as a score, and by using the first usage data and the resolution data as inputs to a trained prediction model, a likelihood of the crash of the app on the first device; and outputting, causing the crash analysis library to present an interactive user interface (UI) on the first device, the score, the state of development of the code, and the workaround.

11. The computer program product of claim 10, the operations further comprising:

forecasting a resolution timeline using the resolution data and the cluster, wherein the resolution data corresponds to the cluster; and outputting to the first device, the resolution timeline.

12. The computer program product of claim 11, the operations further comprising:

receiving an update to the resolution data;

forecasting a new resolution timeline; and sending to the first device, the new resolution timeline.

13. The computer program product of claim 11, wherein the workaround is configured to operate on the first device until an expiry of the resolution timeline.

14. The computer program product of claim 10, the operations further comprising:

constructing a first feature vector corresponding to the feature using the first usage data;

constructing a second feature vector corresponding to the feature using the second usage data;

determining, as a part of the clustering, that the first feature vector is within a threshold degree of similarity of the second feature vector; and transmitting the cluster to a development environment, wherein the resolution data is responsive to the transmitting and corresponds to the cluster.

15. The computer program product of claim 10, wherein the feature of the first usage data comprises navigation data, wherein the navigation data comprises a path data indicative of a user's navigation path in the app, and wherein the navigation data is up to a point in the app such that a set of additional navigation steps after the path will result in the crash.

16. The computer program product of claim 15, wherein the navigation data comprises a sequence of screen transitions in the app, each screen transition having a corresponding time stamp.

17. The computer program product of claim 10, wherein the user input data comprises at least one input on the UI of the app.

18. The computer program product of claim 10, wherein the stored program instructions are stored in a computer readable storage device in a data processing system, and wherein the stored program instructions are transferred over a network from a remote data processing system.

19. The computer program product of claim 10, wherein the program instructions are stored in a computer readable storage device in a server data processing system, and wherein the stored program instructions are downloaded in response to a request over a network to a remote data processing system for use in a computer readable storage device associated with the remote data processing system, the operations further comprising:

metering a use of the program instructions associated with the request; and generating an invoice based on the use.

20. A computer system comprising a set of one or more processors and one or more computer readable storage media, and program instructions collectively stored on the one or more computer readable storage media, the program instructions executable by the set of one or more processors to cause the set of one or more processors to perform operations comprising:

executing a data communication code in conjunction with an application programming interface (API) configured to be in communication with a code of a crash analysis library executing at a first device, to receive a first usage data relating to a behavior of an app during an execution on the first device;

extracting from the first usage data a feature related to the behavior;

clustering, based on the feature, the first usage data into a cluster with a second usage data from a second device;

determining that a user input data in the first usage data indicates a state in the app such that a set of additional user input steps after the state will result in a crash, the crash comprising an unexpected termination of the app;

obtaining, from a remote server in response to sending the cluster to the remote server, resolution data related to the feature, wherein the resolution data comprises at least a state of development of code related to the behavior and a workaround configured to operate on the first device and avoid the crash;

predicting, as a score, and by using the first usage data and the resolution data as inputs to a trained prediction model, a likelihood of the crash of the app on the first device; and outputting, causing the crash analysis library to present an interactive user interface (UI) on the first device, the score, the state of development of the code, and the workaround.

* * * * *